April 1, 1952  H. J. JOHNSON  2,591,075
LIQUID LEVEL GAUGE ATTACHMENT
Filed March 21, 1949
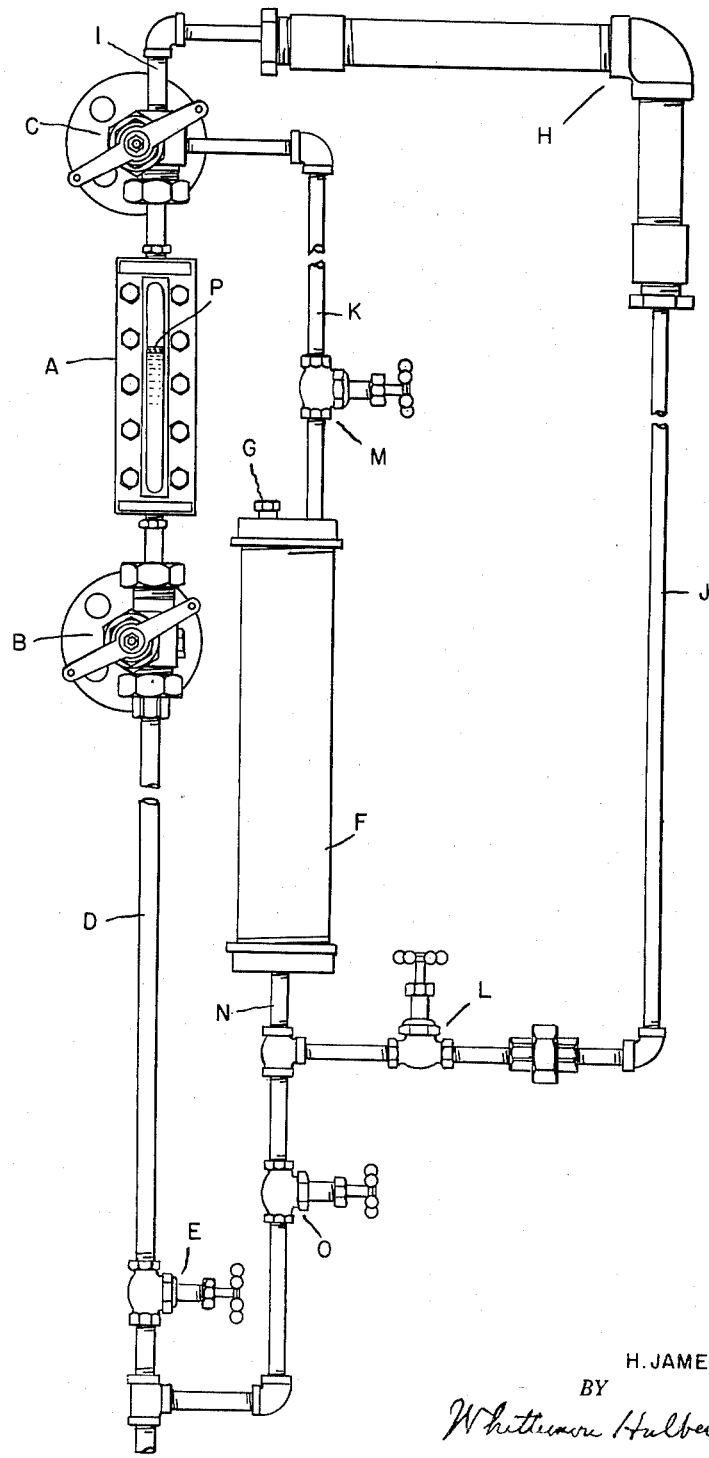
INVENTOR.
H. JAMES JOHNSON
BY
Whittemore Hulbert Belknap
ATTORNEYS Patented Apr. 1, 1952

2,591,075

UNITED STATES PATENT OFFICE 2,591,075

LIQUID LEVEL GAUGE ATTACHMENT

Horace James Johnson, Grosse Pointe, Mich., assignor, by mesne assignments, to Buffalo-Eclipse Corporation, a corporation of New York Application March 21, 1949, Serial No. 82,648

4 Claims. (Cl. 73—323)

The invention relates to liquid level gauges and more particularly to that type in which the level is more clearly indicated by a layer of colored fluid between the liquid and gas filled portions of the gauge.

It is the object of the invention to provide means permanently attached to the gauge by which another fluid (as for instance a colored indicating fluid) may be introduced into the gauge while under pressure at any time and in regulated quantities.

To this end the invention consists in the construction as hereinafter set forth.

In the drawing, which illustrates one embodiment of my invention, the gauge and attachment means are illustrated in front elevation.

With liquid level gauges used on steam boilers and on tanks for other fluids, it is often difficult to read the gauge as both the water and the steam are transparent. This difficulty can be avoided by placing within the gauge tube above the liquid therein a colored fluid, or less transparent fluid, which is non-miscible with the water and of lesser specific gravity. However, as the water within the gauge is frequently blown down, it is necessary to renew the layer of colored fluid. My improvement comprises a permanent attachment to the gauge including a container for the colored or other fluid located in an accessible position more or less remote from the gauge. A condenser connected with the steam or vapor space of the gauge located above the highest level, and valve controlled connecting conduits through which the indicating liquid may be displaced by hydrostatic pressure from the container into the gauge above the liquid therein.

As illustrated in the drawing, A is a liquid level gauge of any suitable construction, and which is provided with the usual liquid and steam connections to the boiler or tank controlled, respectively, by shut-off valves B and C. There is also the usual downwardly extending blow-off conduit D connected with the lower end of the gauge and controlled by a normally closed valve E. My attachment comprises a container F which, as above described, is located preferably at a lower level than the gauge and in easily accessible position. This container has a fill opening at its upper end normally closed by a cap G. H is a condenser located above the highest level in the gauge and connected at its upper end by a conduit I to the steam or vapor space. A conduit J connects the lower end of the condenser with the lower end of the container F, and a conduit K connects the upper end of said container with the steam space of the gauge. Shut-off valves L and M are arranged in the respective conduits. There is also a drain conduit N for the container F and a valve O therein.

With the construction as described, the container F may be filled by closing the valves L and M, removing the cap G and opening the valve O to drain out any water that may be in the container. The valve O is then closed, and the container F is filled with a liquid non-miscible with and of lower specific gravity than the water or any other liquid in the tank to which the gauge is connected, after which the cap G is replaced. As the condenser H is constant communication with the steam or vapor space within the gauge and the boiler or tank, it will be filled with condensate which will also fill the conduit J. Whenever it is desired to introduce indicator liquid into the gauge, the valve L is opened and the valve M is also opened to a slight degree to permit the fluid from the container to gradually pass therefrom into the conduit K and into the gauge where it forms a layer P above the non-miscible liquid therein. The valve M is then closed until such time as it is necessary to renew the indicating layer in the gauge. It will be understood that this displacement of liquid from the container F is effected by the weight of the hydrostatic column in the conduit J and condenser H. As the latter is above the liquid level in the gauge, the weight of this column is always in excess of the weight in the container F and column K. Consequently, such displacement will take place regardless of the steam or vapor pressure.

What I claim as my invention is:

1. The combination with a liquid level gauge having portions respectively containing liquid and vapor under pressure, of means for introducing into said gauge a non-miscible liquid of lower specific gravity, comprising a container for the latter liquid, a condenser, a vapor supplying connection to said condenser, a valve controlled connection between the condenser and the lower end of said container, and a connection between the upper end of said container and the upper end of said gauge through which liquid may be discharged by the hydrostatic pressure of the condensate in said condenser.

2. The combination with a liquid level gauge having portions respectively containing liquid and vapor under pressure, of means for introducing into said gauge a non-miscible liquid of lower specific gravity, comprising a container for the latter liquid, a condenser connected with the vapor containing portion of the gauge, a valve controlled connection between the lower end of said condenser and the lower end of said container, and a valve controlled connection between the upper end of said container and the upper end of said gauge through which the container liquid may be discharged by hydrostatic pressure of the condensate only when both valves are open.

3. The combination with a liquid level gauge having portions respectively containing liquid and vapor under pressure, of means for introducing a non-miscible indicator liquid into said gauge above the liquid in the latter, comprising a container for said indicator liquid, a condenser connected with the vapor containing portion of said gauge, and valve controlled connections respectively between the lower end of said condenser and the lower end of said container and between the upper end of said container and gauge above the liquid level in the latter.

4. The combination with a liquid level gauge having portions respectively containing liquid and vapor under pressure, of means for introducing into said gauge a non-miscible liquid of lower specific gravity, comprising a container for the latter liquid, a condenser connected with the vapor containing portion of said gauge, valve controlled connections respectively between the lower end of said condenser and the lower end of said container and between the upper end of said container and the upper end of said gauge, a removable cap for a filler opening into said container, and a valve controlled drain connection with said container.

H. JAMES JOHNSON.

REFERENCES CITED

The following references are of record in the file of this patent:

UNITED STATES PATENTS

| Number | Name | Date |
|--------|------|------|
| 1,701,914 | Ernst | Feb. 12, 1929 |

FOREIGN PATENTS

| Number | Country | Date |
|--------|---------|------|
| 36,932 | Sweden | June 10, 1914 |